Sept. 13, 1966   L. PISANI ETAL   3,271,838
MACHINE FOR CUTTING TUBULAR FABRIC
Filed May 18, 1965   10 Sheets-Sheet 5

United States Patent Office 3,271,838
Patented Sept. 13, 1966

3,271,838
MACHINE FOR CUTTING TUBULAR FABRIC
Luigi Pisani and Giuseppe Spaltini, both of Cilavegna, Pavia, Italy, assignors to S.p.A. Virginio Rimoldi & C., Milan, Italy, and Officina Meccanica Pisani & Spaltini, Cilavegna, Pavia, Italy
Filed May 18, 1965, Ser. No. 456,622
Claims priority, application Italy, May 21, 1964, 11,140/64; Apr. 14, 1965, 9,237/65
15 Claims. (Cl. 29—2.16)

This invention relates to a machine for cutting upon the bias endless bands from tubular fabric, more particularly knitted fabric.

It is known that band material is largely used for various purposes in articles of wear, such as for use as border, trimming and the like, and the band should be cut upon the bias instead of straight, this being essential when the band is cut from knitted fabric. Devices are known for the purpose which, however, do not operate in a continuous and rational manner and are moreover complicated and expensive.

This invention provides a machine for cutting in a continuous and a rational manner band material from a tubular fabric, more particularly knitted fabric, wherein the selected band width is maintained constant independently of the rate of feed and size of the starting fabric, the feed of the tubular fabric to the cutting members being commensurate to the rate of feed and being effected in such manner as to avoid stretching of the fabric, an auxiliary device being provided for subdividing the band cut from the fabric into narrower strips.

The machine for cutting upon the bias endless bands from tubular fabric, more particularly knitted fabric, comprises a top frame rotating about a vertical axis and supporting a tubular fabric roll arranged horizontally, from which the fabric is fed, as it is restored to its tubular form, to an underlying rotary member comprising a plurality of articulated arms arranged to form a truncated cone tapering upwardly, and supporting at their bottom end rollers which are radially orientated and loosely rotate about horizontal axes, means for varying the inclination of the cone and suiting the circumference on which the end rollers are arranged to the size of the tubular fabric, a plurality of arms articulated by their top ends to the bottom of the rotary frame and extending downwardly substantially parallel with the arms forming the frustum-shaped rotary member, against which they are held by the action of spring means, said arms articulated to the top frame supporting at their bottom ends rollers rotatable about horizontal axes, tangential to the circular development of the fabric placed on the frustum-shaped member, and cooperating with the rollers on the internal rotary member, means for rotating at an adjustable speed the outer rollers to feed the fabric downwardly as it rotates together with the top frame, the frustum-shaped member and the abovementioned arms, and a circular cutter cooperating with a rotating counterroller, both being supported by stationary supports, to cut an endless band from the bottom edge of the tubular fabric interposed between the said cutter and counterroller, by effect of the rotary motion of the fabric combined with its feed motion. Further characteristic features and purposes of this invention will be understood from the appended detailed description referring to the accompanying drawings which show by way of a non-limiting example a preferred embodiment thereof.

Referring to FIGURES 1 to 5, a frame 1 supports the various machine components and rests on a foundation 2 provided with cross guides 2a for displacement of the frame with respect to the foundation.

Figure 1:
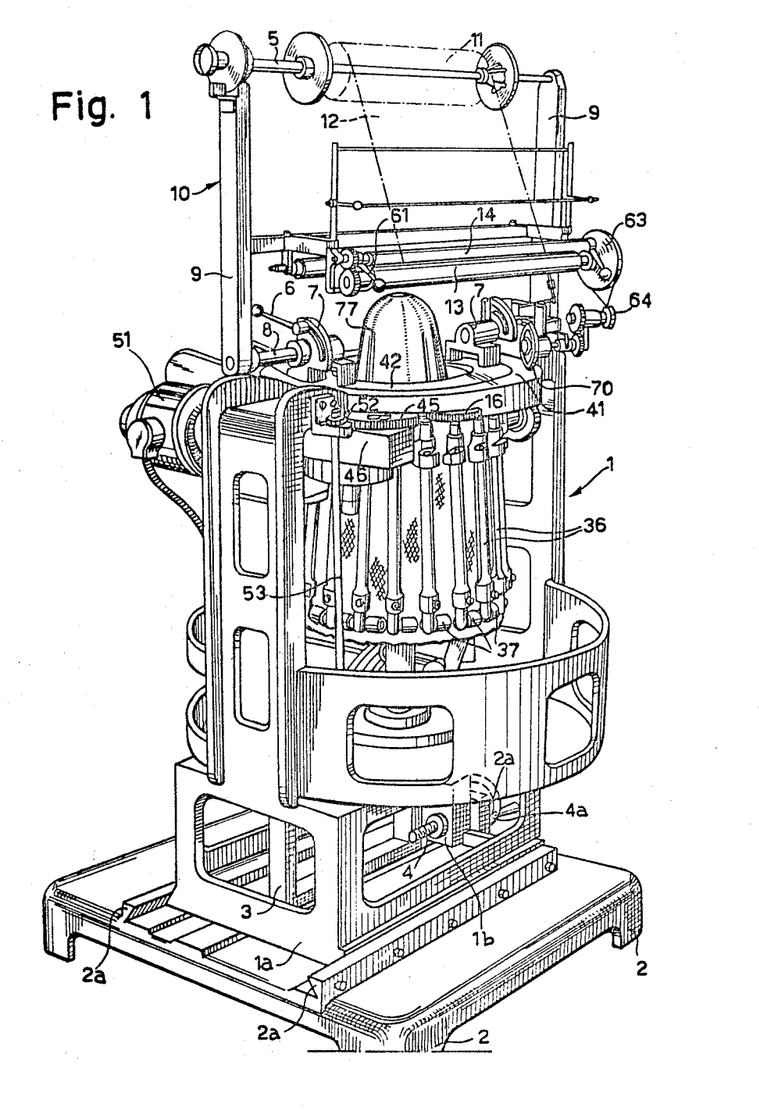
FIGURE 1 is a perspective view of a machine according to this invention.
Figure 3:
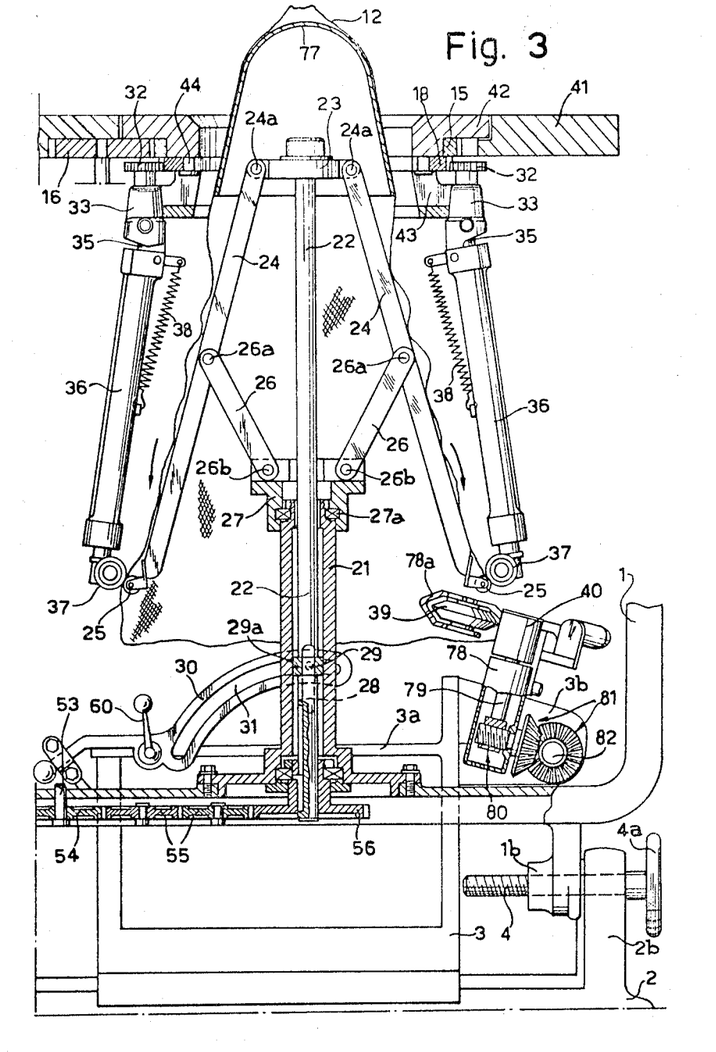
FIGURE 3 is an axial sectional view of the machine.

A further frame portion 3 is securedly fixed to the foundation 2 and supports part of the machine components. The frame 1 is moved with respect to the foundation 2 by means of a screw spindle 4 provided with a hand wheel 4a and supported by a strap 2b fast with the foundation 2, the spindle 4 being engaged by a nut 1b fast with the frame 1 (FIGURES 1 and 3).

An annular plate 41 is fixedly secured to the top of frame 1 and extends horizontally and supports through rolling members 43 an annular member 42 coaxial with the plate (FIGURES 1, 2, 3, 5).

An annular gear 15 is secured to the annular member 42 and meshes with a gear 16 connected through a further idle gear 45 to a variable speed gear 46. The variable speed gear is connected in turn by idle gears 47, 48, 49, 50 to an electric motor 51 driving the annular element 42 for rotation about a vertical axis.

Figure 2:
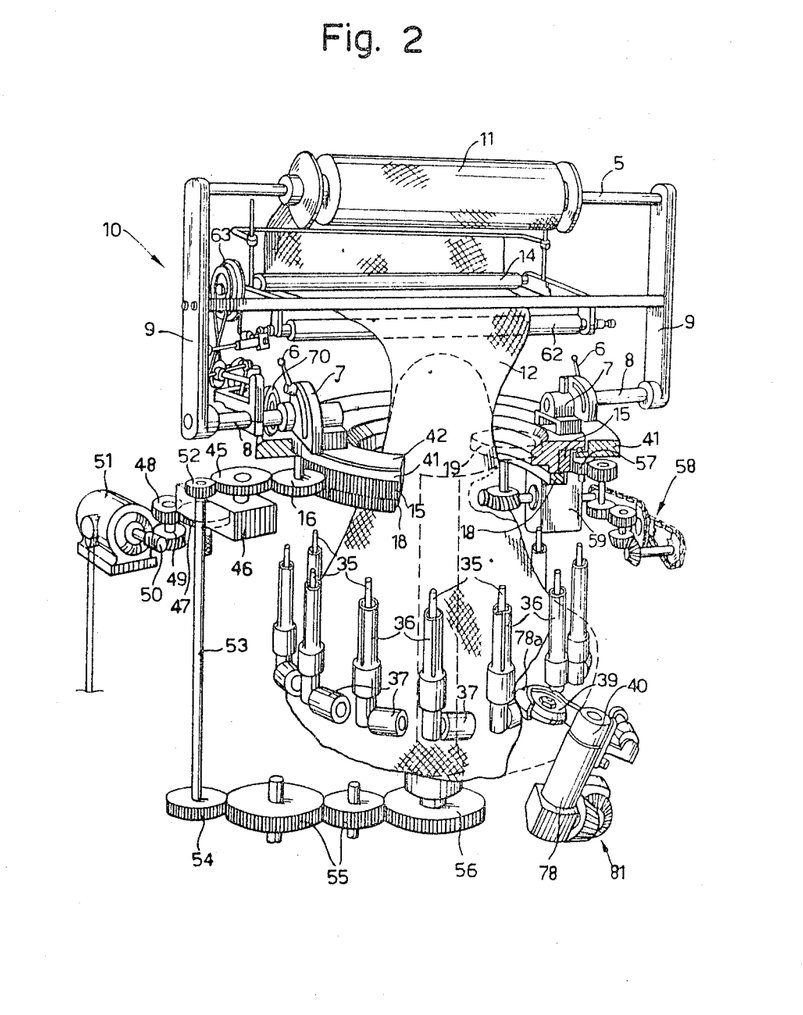
FIGURE 2 is a part transparent perspective view of the top machine portion.
Figure 4:
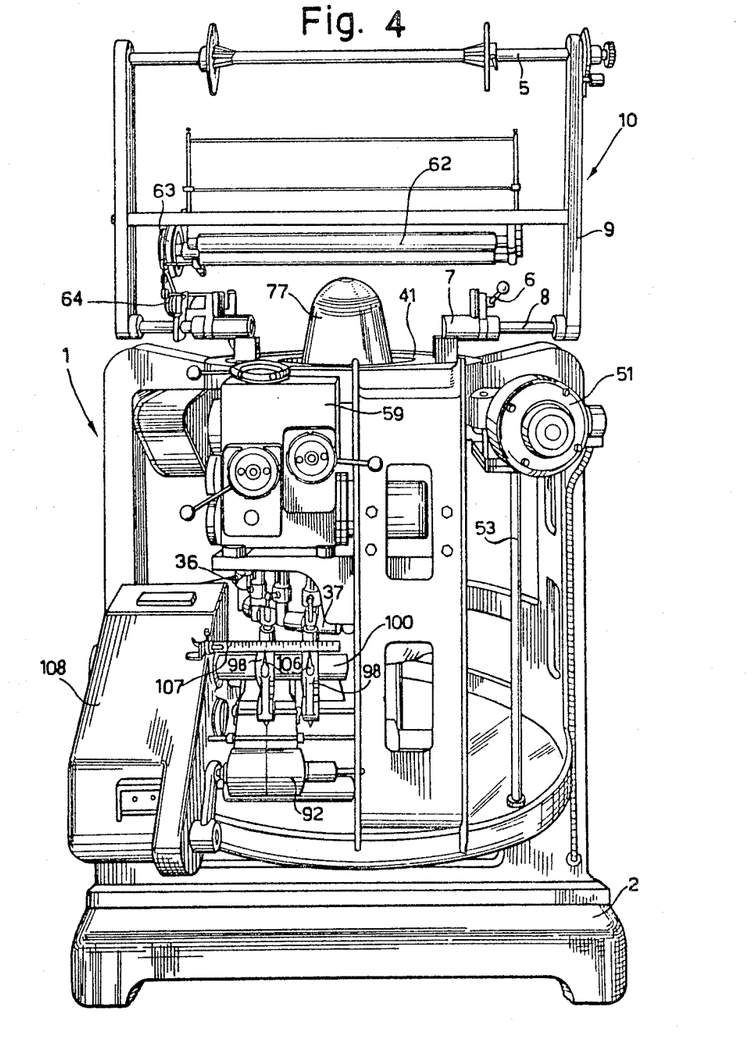
FIGURE 4 is a perspective view from the side opposite FIGURE 1.

A plurality of rollers 44 are secured to the bottom face of the annular member 42, the rollers 44 rotating about vertical axes and being provided with protruding bottom edges 44a. The rollers 44 rotatably support a further annular gear 18 arranged coaxially beneath the annular gear 15 secured to the annular member 42. The annular gear 18 cooperates with a gear 19 connected to a speed box 59 having a high number of speeds (FIGURES 2, 4). The speed box is connected in turn by idle gears 58 to a pinion 57 meshing with the top annular gear 15, so that movement from the top annular gear 15 is transmitted to the bottom annular gear 18 through the speed box 59, whereby the speeds of the two annular gears can be differentiated.

The gear 45 cooperating with the gear 16 driving the top annular gear 15 meshes in turn with an idle gear 52 fast with a vertical shaft 53 having secured to its other end a further gear 54 connected through intermediate gears 55 with a pinion 56 adapted to drive a rotary member described hereafter.

The annular member 42 supports a frame 10 having two standards 9 braced by cross members and pivoted at the bottom to two horizontal pivots 8 secured to two supports 7 fast with the said annular member 42. The supports are provided with levers 6 for releasing the pivots 8 in order to rotate the frame bodily about the axes of the said pivots.

The frame member 10 carries at the top a rod 5 supporting a roll of tubular knitted fabric 12 feeding the machine.

As shown in FIGURES 6, 7, 8, 9, the top frame 10 supports a pair of pressure rollers 13, 14 provided at one end with cooperating gears 13a, 14a; the rollers are adapted to unroll the fabric 12 from the roll 11 and convey it over an idle roller 62 loosely mounted on the frame to the utilizing members on the machine.

The two pressure rollers 13, 14 extend parallel with the feed roller 11 and are laterally displaced with respect to the rotational axis of the frame member 10.

The guide roller 62 is arranged horizontally to intersect the rotational axis of the machine.

One pressure roller 14 is eccentrically supported and is rotated about its axis by means of two levers 61 arranged at the ends of the roller in order to vary the spacing of the two rollers 13, 14.

Figure 6:
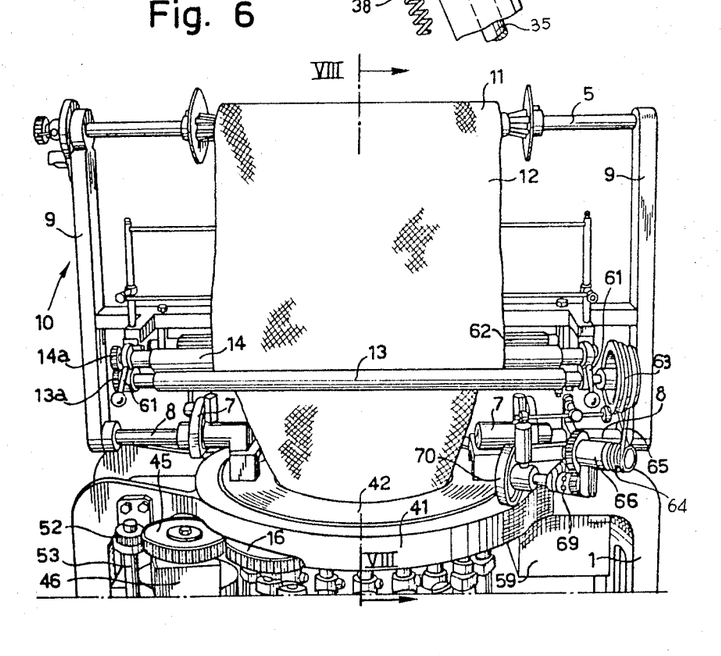
FIGURE 6 is a perspective view of the top machine portion.
Figure 7:
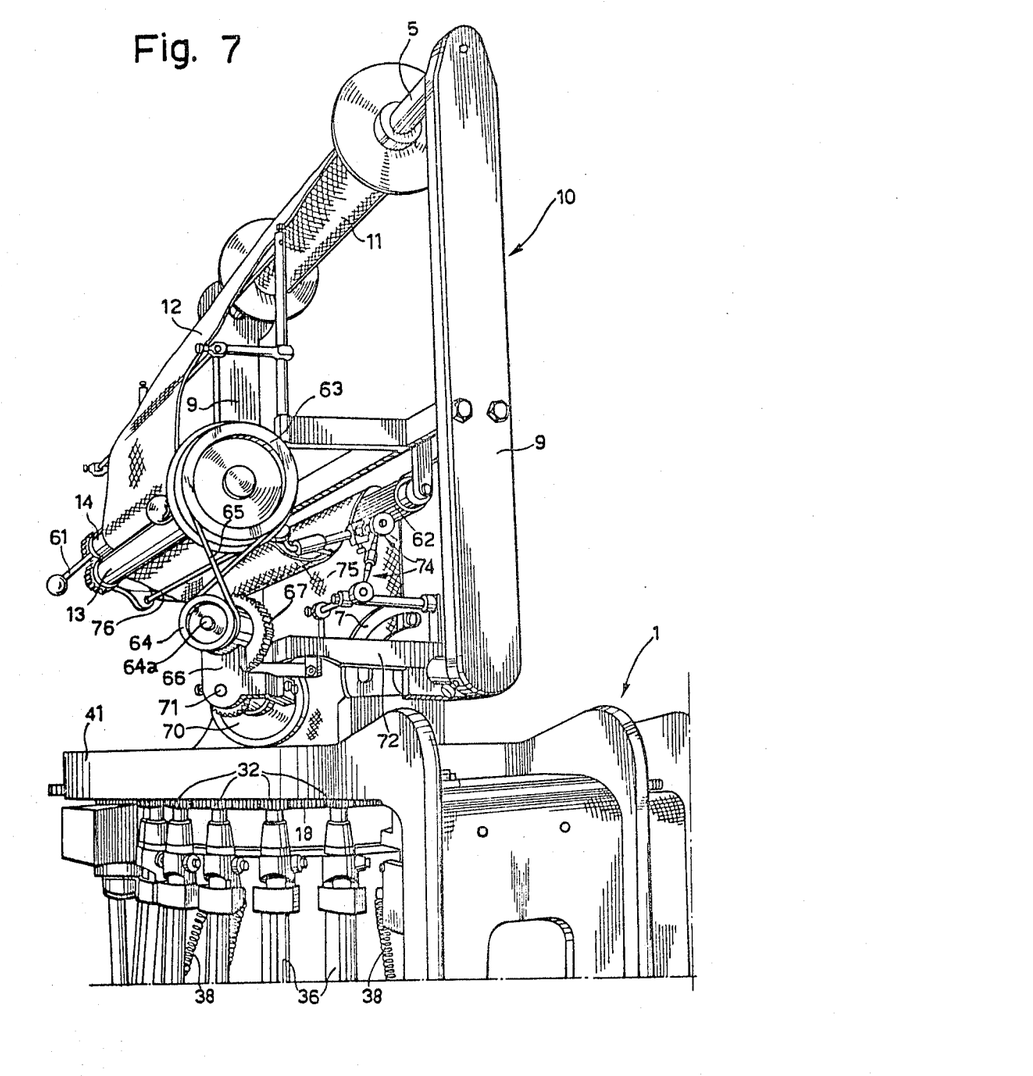
FIGURE 7 is a further perspective view of the fabric feed means.
Figure 9:
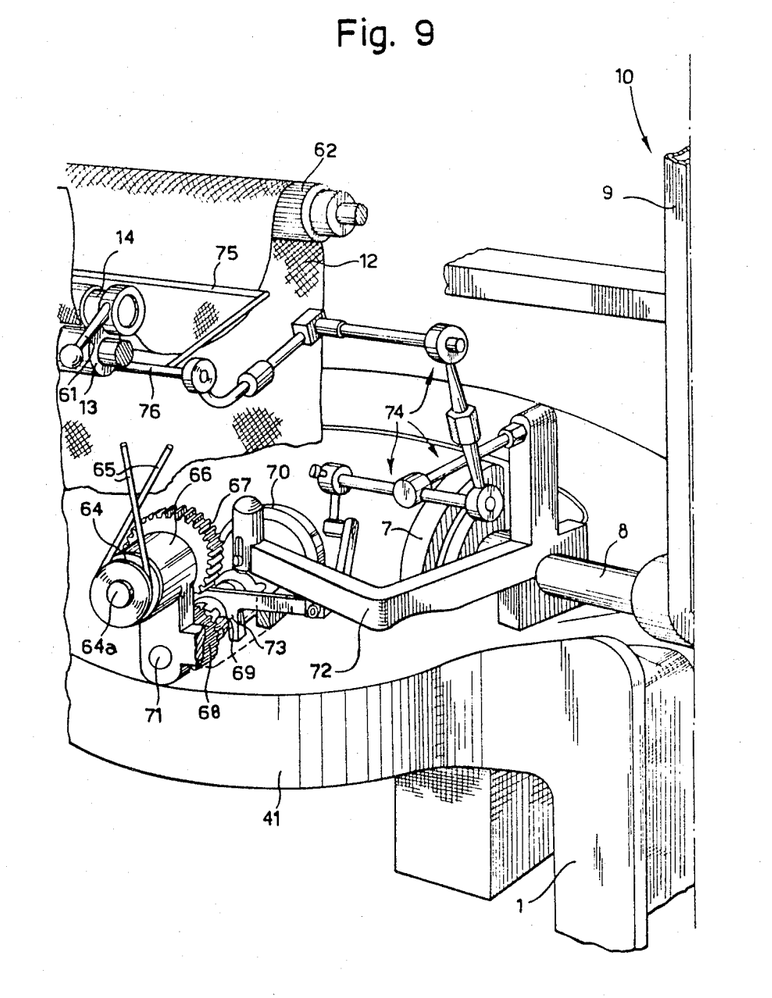
FIGURE 9 is a part perspective view of the fabric feed means.

The shaft of one roller 13 has keyed thereto a pulley for V belts 63 connected by a belt 65 to a pulley 64 which is keyed to the end of a shaft 64a mounted in a support 66 connected by a bell crank arm 72 to one support 7 for the frame member 10 (FIGURES 6, 7, 9).

A toothed wheel 67 is keyed to the other end of the shaft 64a and cooperates with a gear 68 loosely mounted on a shaft 71 parallel with the shaft 64a.

A wheel 70 is keyed to the other end of the shaft 71 and is caused to roll by rotation of the frame member 10 on a circular path on the annular member 41 on the stationary frame member 1.

The wheel 70 is provided with a dog clutch 69 by means of which it can be connected with the gear 68 in order to transmit rotation through the other gear 67 to the pulley 64 and drive the pressure roller 13 connected by the belt 65 to the said pulley.

Figures 8, 12:
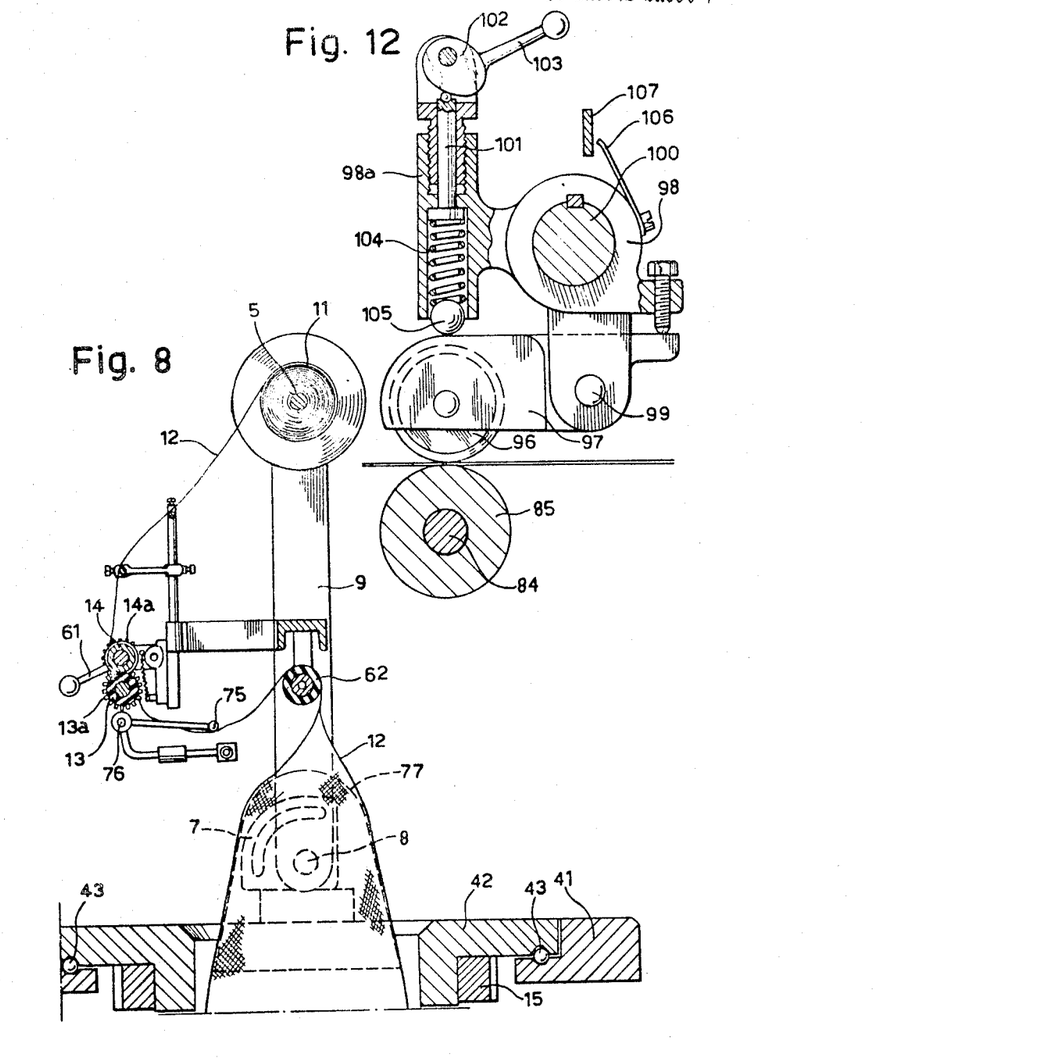
FIGURE 8 is an axial sectional view on line VIII—VIII of FIGURE 6.
FIGURE 12 is a sectional view on line XII—XII of FIGURE 10 showing on an enlarged scale a detail of the auxiliary cutter.

By effect of rotation about a vertical axis of the frame member 10 the wheel 70 is steadily rotated. The rotary motion can be transmitted to the cylinder 13 only when the clutch 69 operatively connects the wheel 70 with the other components. The clutch 69 is actuated by a fork 73 connected by transmission 74 to a frame 75 capable of annular movement about a pivot 76 parallel with the axes of the pressure cylinders 13, 14 (FIGURES 8, 9).

The frame member 75 is normally arranged above the loop in the fabric 12 which is formed between the pressure rollers 13, 14 and guide roller 62.

When this fabric portion is stretched on feed the frame member 75 is raised and actuates on rotating the fork 73 and couples the clutch 69. Consequently, the rotary motion of the wheel 70 is transmitted to the pressure rollers 13, 14 which unroll the fabric from the supply roll 11.

Unrolling releases the tension in the abovementioned fabric loop, so that the frame member 75 is lowered and uncouples the clutch 69 and stops the pressure rollers 13, 14.

With the above described device an unstretched fabric supply is available ahead the guide roller 62, so that the underlying utilizing members are fed without causing any stretch in the fabric, which would otherwise, on account of the nature of the knitted fabric, lead to variation in largeness of the band cut therefrom.

As shown in FIGURES 1 to 3, the bottom portion of the stationary frame 1 supports a rotary shaft 22 extending vertically and connected by the previously described gears 56, 55 and 54 to the vertical secondary shaft 53 deriving motion from the top annular gear 15. The total ratio of the transmission members is such that the shaft 22 rotates at the same angular speed as the annular gear 15. The shaft 22 is housed by a stationary sleeve 21 through the interposition of rolling members.

The shaft 22 carries at its top end a flange 23 having articulated thereto at 24a a plurality of swing arms 24 carrying at their bottom ends idle rollers 25 loosely rotatable about horizontal axes, arranged tangentially of the circumference described by the rollers during rotation of the shaft 22.

The top of the sleeve 21 supports through the interposition of rolling means 27a a rotary threaded collar 27 having articulated thereto at 26b a plurality of links 26 hinged at their opposite ends to an intermediate point 26a on the swing arms 24.

The arms 24, links 26 and collar 27 rotate fast with the shaft 22.

An annular groove is cut in the bottom portion of the shaft 22 and engages a collar 29a having one radial pin 29 at least extending beyond the sleeve 21 through one slit 28 at least longitudinally cut in the sleeve.

The pivot 29 is engaged by an eyelet 31 of arcuated shape in a plate 30 mounted horizontally displaceable on a stationary part 3a of the inner frame member 3 fast with the foundation 2. An eccentric lever 60 locks the arcuated plate 30 in the desired position.

Displacement in either direction of the plate moves the shaft 22 upwardly or downwardly so as to vary the inclination of the arm 24 with respect to a vertical plane.

The abovementioned arms form jointly a frustum-shaped rotary member tapering upwardly, the taper of which can be varied, as mentioned above, by acting on the arcuated plate 30 in order to suit the diameter of the circumference on which the end rollers 25 are situated to the axial size of the tubular knitted fabric 12 on the said rotary member, fed from the top rotary frame member 10. An ogival cup 77 is arranged above the rotary member 42 and promotes movement of the tubular fabric 12 towards the rotary member, and assists it in resuming its primitive tubular form.

Figure 5:
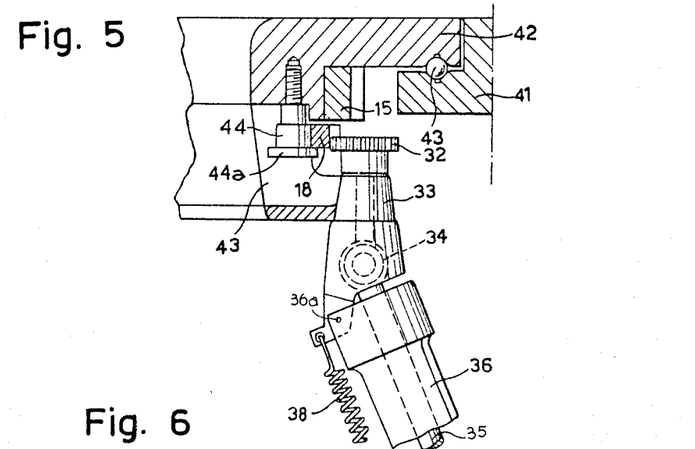
FIGURE 5 is an axial sectional view on an enlarged scale of a detail of FIGURE 3.

The annular member 2 which rotates together with the top annular gearing 15 supports by means of extension 43 a plurality of brackets 33 having articulated thereto at 36a arms 36 adapted to take a position substantially parallel with the arms 24 forming the inner rotary member (FIGURES 3, 5).

The arms 36 match in number the arms 24 of the inner member and support at their bottom ends rollers 37 rotatable about horizontal axes arranged tangentially of the fabric travelling over the rollers 25 on the inner rotary member. A plurality of springs 48 hold the arms 36 against the arms 24 of the inner member to press each roller 37 against its cooperating roller 25 and thereby engage the tubular fabric 12, interposed between the two sets of rollers the supports of which rotate with the fabric, about the vertical axis of the machine at the same speed.

The rollers 37 are rotated through transmission from shafts 35 housed within the arms 36 and connected by cardan joints 34 to a plurality of planet wheels 32 meshing with the bottom internal gear 18 supported by the annular member 42 and rotating at a different speed.

By effect of the rotation transmitted to the rollers 37 the tubular fabric which is slipped on the inner member and rotates together with the latter and arms 36, is moved downwardly and is thereby fed further.

Adjustment in speed of the bottom internal gearing 18 through the various gears of the speed box 59 results in a variation in speed of the rollers 37 which affects the rate of feed in order to vary the width of the band cut from the fabric, whichever the diameter of the latter.

As shown in FIGURES 2 and 3, the stationary frame member 3 has securely fixed thereto a bracket 3b carrying a shaped support 78 having mounted therein a roller 40 cooperating with a circular cutter 39 loosely supported by an extension 78a on the support 78.

Figure 11:
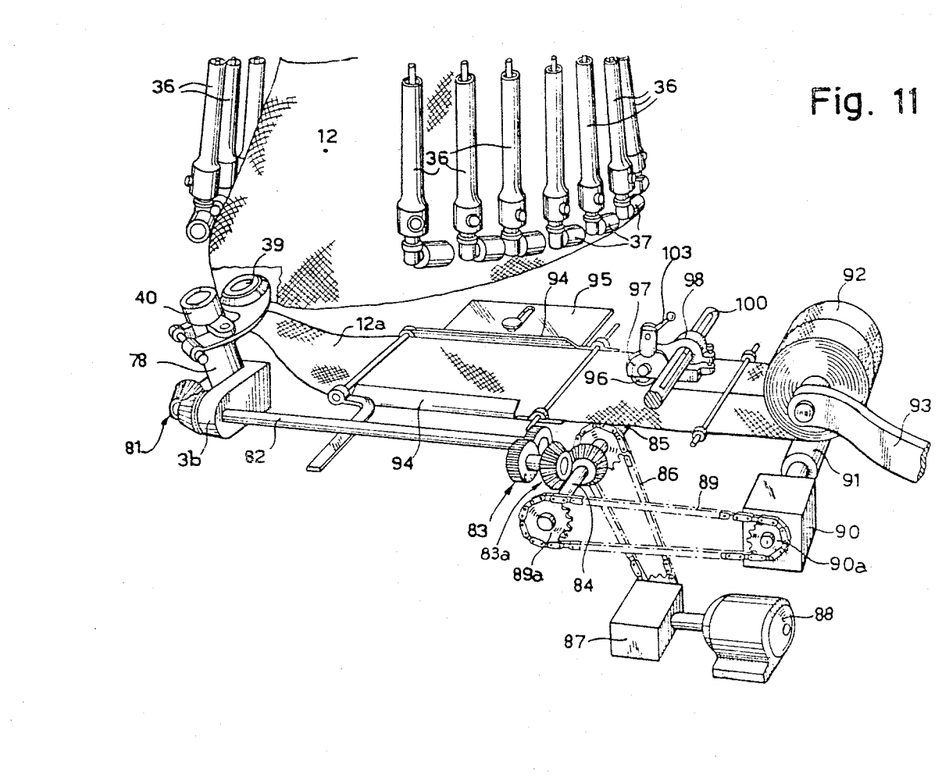
FIGURE 11 is a diagrammatical perspective view of the control means for the cutter and auxiliary cutting device.

The roller 40 is keyed to a shaft 79 which is connected by means of a first pair of bevel pinions 80 arranged within the support 78, and a further pair of bevel pinions 81 to a horizontal transmission shaft 82 which receives motion from an outer motor 88, as shown in FIGURE 11 and described in detail hereafter.

The cutter 39 is arranged within the tubular fabric which by effect of the rotary motion combined with the feed motion is caused to travel between the cutter 39 and roller 40 cooperating therewith, whereby an endless band is cut from the bottom edge of the fabric.

Since the cutter 39 is fixed in position, transverse adjustment in position of the frame member 1 with respect to the stationary frame member 3 will suit the position of the cutter 39 to the size of the tubular fabric.

As mentioned above, the roller 40 cooperating with the circular cutter 39 receives motion from an electric motor 88 which moreover drives an auxiliary device for subdividing the band 12*a* cut from the fabric into a number of narrower strips.

This device, which is shown in FIGURES 4, 10, 11 and 12, comprises pull cylinder 91 rotating about a horizontal axis and having lightly pressed thereagainst an idle roller 92 on which the band 12 cut from the fabric is wound. The roller 92 extends parallel with the pull cylinder 91 and is supported by a swing arm 93. The device moreover comprises at least one circular cutter 96 loosely mounted on a support (97, 98) secured to a cross rod 100, the cutter cooperating with a counter-roller 85 parallel with the pull cylinder 91 and equalling in width at least the maximum width of the band 12*a* cut by the main cutter 39.

The pull cylinder 91 and counter-roller 85 are rotated from the same motor 88 driving the main cutter 39.

As shown in FIGURE 11, the motor 88 is connected with a variable speed gear 87, the output gear of which rotates, through a sprocket transmission 96 a shaft 84 having the counter-roller 85 mounted thereon.

The shaft 84 transmits motion through bevel pinions 83*a* and gears 83 to the transmission shaft 82 which rotates through the abovementioned gears 81 the roller 40 cooperating with the main cutter 39.

The shaft 84 on the counter-roller 85 is moreover connected through a sprocket transmission 89*a*, 89, 90*a* and a friction clutch device 90 to the pull cylinder 91.

Before reaching the auxiliary cutter 96 the band 12*a* to be subdivided travels over board 95 having secured thereto transversely movable slides acting as longitudinal guides for the ribbon.

As shown in FIGURE 12 the auxiliary cutter 96 is supported by a fork 97 articulated at one end to a pivot 99 fast with a support 98 keyed to the cross bar 100. The support 98 is formed with an extension 98*a* slidably receiving a rod 101 actuated at its top end by an eccentric 102 provided with a control lever 103, the rod 101 acting through the interposition of a spring 104 on a ball 105 adapted to transmit the axial thrust from the eccentric 102 to the fork 97 supporting the auxiliary cutter 96. By acting on the eccentric 102 the cutter 96 can be drawn towards and away from the band in order to operate the cutter or disable it.

Figure 10:
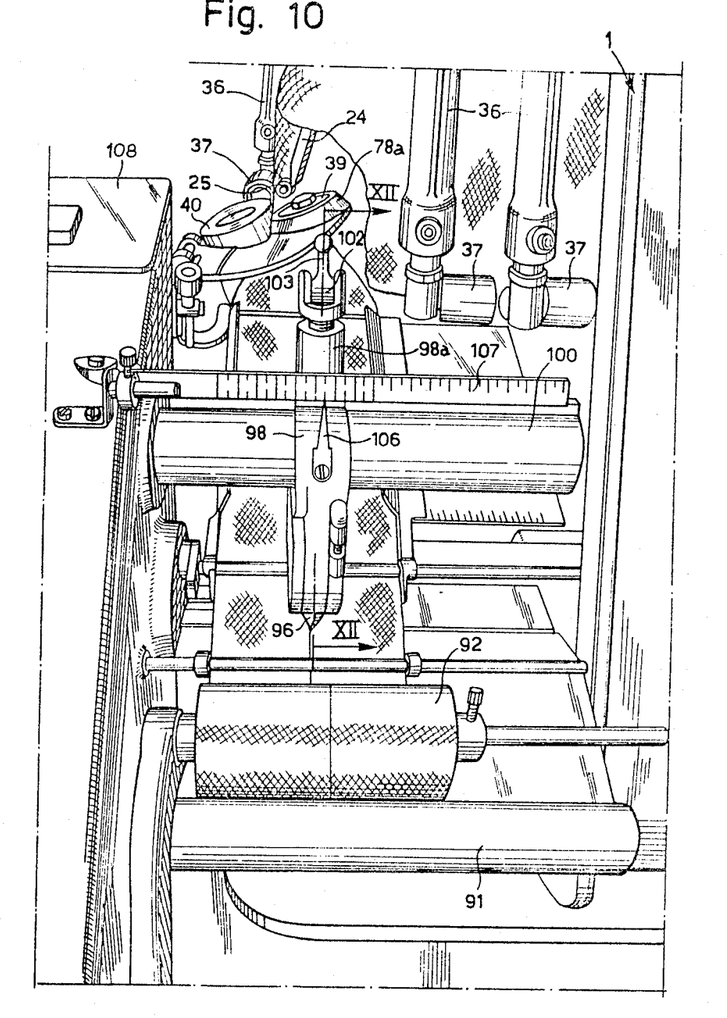
FIGURE 10 is a perspective view showing the device for cutting the band to narrow strips.

As shown in FIGURES 4, 10 and 12 the support 98 for the cutter has externally secured thereto a pointer 106 cooperating with a graduated scale 107 fast with the frame member 1 of the machine, adapted to assist in setting the width of the strips to be cut.

When the ribbon 12*a* has to be cut to a larger number of strips, the number of auxiliary cutters 96 and mechanisms therefor is varied accordingly.

In FIGURES 4 and 10 a hood 108 covers the transmission members rotating the main cutter, pull cylinder 91 and counter-roller 85 cooperating with the auxiliary cutter 96.

What we claim is:

1. Machine for cutting upon the bias an endless band from a tubular, more particularly knitted fabric, comprising a top frame rotating about a vertical axis and supporting a horizontally extending roll of tubular fabric, from which the fabric is unrolled and is slipped after resuming its tubular form over an underlying rotary member comprising a plurality of articulated arms arranged to form an upwardly tapering conical frustum and supporting at their bottom ends radially orientated rollers idly rotating about horizontal axes, means for varying the inclination of said conical frustum, a plurality of arms articulated by their top ends to the base of the rotary frame, extending downwardly in a substantially parallel relationship to the arms forming the rotating conical frustum, against which they are held close by the action of resilient means, said arms articulated to the top frame supporting at their bottom ends rollers rotatable about horizontal axes, tangential to the circular development of the fabric slipped over the conical frustum and cooperating with the rollers on the internal rotary member, means for rotating at an adjustable speed the outer rollers in order to feed the fabric downwardly and a circular cutter cooperating with a backing roller, both supported by stationary supports, for cutting an endless band from the bottom edge of the tubular fabric.

2. Machine as claimed in claim 1, wherein the rotary parts are supported by a main frame slidably mounted in a transverse direction on a lower frame, an inner frame fast with the lower frame supporting the circular cutter.

3. Machine as claimed in claim 1, wherein the top frame is fast with an annular member rotatably mounted on an annular plate fast with the main frame and carrying an annular toothed rim operated through drives from a motor, said annular member supporting at the bottom through vertically arranged rollers a further toothed rim coaxial therewith.

4. Machine as claimed in claim 1, wherein the arms forming the frustum-shaped rotary member are articulated by their top ends to a flange secured to the top of a vertical shaft connected by drives to said top annular toothed rim, said vertical shaft being housed by a stationary sleeve supporting a rotary collar having pivoted thereto connecting rods articulated by their opposite ends to intermediate regions on said arms, said vertical shaft being formed with a circular groove axially engaging a collar provided with at least one radial pin extending through the sleeve through at least one slot cut in the sleeve, engaging an arcuated plate, formed with an arcuated groove, horizontally sliding over a stationary portion on an inner frame, said arcuated plate being fast with the foundation and being provided with an eccentric lock lever.

5. Machine as claimed in claim 1, wherein the feed rollers at the bottom end of the arms arranged outside the rotary frustum-shaped member are connected by transmission shafts coaxial with said arms and cardan joints to a plurality of planet wheels meshing with the bottom toothed rim supported by the annular member acting as a base for the top rotary frame.

6. Machine as claimed in claim 1, wherein the two toothed rims rotating the top frame and planet wheels, respectively, driving the feed rollers, are driven from one electric motor through the interposition of means for differentiating the speeds of said two toothed rims, the top toothed rim being connected with the frustum-shaped member to move the latter at the same angular speed as the said top frame.

7. Machine as claimed in claim 6, wherein the means for differentiating the speed of the two said annular toothed rims comprise a variable speed transmission interposed between the motor and top toothed rim and a change speed gear having a large number of transmission gears, incorporated by a gear interconnecting the top and bottom toothed rims.

8. Machine as claimed in claim 1, wherein the cutter is arranged within the fabric to be cut, the backing roller cooperating therewith being arranged outside the fabric.

9. Machine as claimed in claim 1, wherein the backing roller cooperating with the circular cutter is driven from an auxiliary motor.

10. Machine as claimed in claim 1, wherein the fabric is unrolled from the roll supported by the rotary top frame intermittently by a pair of pressure cylinders, parallel with the supply roll, laterally offset from the rotational axis of the machine, the fabric issuing from between the pressure rollers being guided over a further roller horizontally arranged to intersect the rotational axis, means being provided for rotating said pressure rollers when the fabric section between said rollers and guide roller is stretched by effect of the fabric feed, and stopping rotation of the pressure rollers when the stretch on said fabric section is released by the paying off of the web by the pressure rollers.

11. Machine as claimed in claim 10, wherein the means for intermittently rotating the pressure rollers which unwind the fabric from the supply roll comprise a wheel steadily rolling by effect of the rotation of the top frame over a track fast with the stationary machine part, and a drive interconnecting said wheel and one pressure roller through the interposition of a clutch adapted to uncouple or couple the drive, said clutch being controlled by a movable frame mounted on a pivot parallel with the pressure cylinders, said frame being angularly urged by the stretch on the fabric section intermediate the pressure rollers and guide rollers, the arrangement being such that the increase in stretch of said fabric section rotates the movable frame upwardly and throws in the said clutch in order to actuate the drive and rotate the pressure rollers.

12. Machine as claimed in claim 10, wherein the pressure cylinders are provided with means for increasing and reducing, respectively, the spacing of their axes.

13. Machine as claimed in claim 1, wherein an auxiliary device is provided for subdividing the band cut by the main cutter into narrower strips, said device comprising one auxiliary cutter at least cooperating with a backing roller rotated from the same motor as the main cutter, the band being fed by a draw roller driven from said motor and cooperating with an idle roller supported by a swing arm and having the band wound thereon.

14. Machine as claimed in claim 13, wherein guides are arranged ahead the auxiliary cutter and are transversely adjustable along an adjustment board.

15. Machine as claimed in claim 13, wherein the auxiliary cutter is supported by a fork articulated at one end to a support secured for transverse adjustment to a bar arranged transversely of the band, said support being provided with lever means for drawing the auxiliary cutter towards or apart from the backing roller over which the band to be cut travels.

No references cited.

RICHARD H. EANES, JR., *Primary Examiner.*